US008640185B2

(12) United States Patent
Hayashida

(10) Patent No.: US 8,640,185 B2
(45) Date of Patent: Jan. 28, 2014

(54) PERSONAL-INFORMATION MANAGING APPARATUS AND PERSONAL-INFORMATION HANDLING APPARATUS

(75) Inventor: Naoko Hayashida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 554 days.

(21) Appl. No.: 12/557,006

(22) Filed: Sep. 10, 2009

(65) Prior Publication Data

US 2010/0088743 A1   Apr. 8, 2010

(30) Foreign Application Priority Data

Oct. 3, 2008   (JP) ................................. 2008-258793

(51) Int. Cl.
*G06F 21/00* (2013.01)
(52) U.S. Cl.
USPC .................... 726/1; 726/26; 380/287; 713/36
(58) Field of Classification Search
USPC .................... 726/1, 26; 380/1–287; 713/1–36
See application file for complete search history.

(56) References Cited

U.S. PATENT DOCUMENTS

| 8,245,034 | B2 | 8/2012 | Hatakeyama et al. | |
|---|---|---|---|---|
| 2003/0083954 | A1* | 5/2003 | Namba | 705/26 |
| 2003/0101341 | A1* | 5/2003 | Kettler et al. | 713/162 |
| 2003/0163705 | A1* | 8/2003 | Richards et al. | 713/182 |
| 2005/0086061 | A1 | 4/2005 | Holtmanns et al. | |

FOREIGN PATENT DOCUMENTS

| JP | 2001-175734 | 6/2001 |
|---|---|---|
| JP | 2002-2913 | 1/2002 |
| JP | 2002-324068 A | 11/2002 |
| JP | 2004-260716 | 9/2004 |
| JP | 2005-506642 A | 3/2005 |
| JP | 2005-258606 A | 9/2005 |
| JP | 2006-338587 A | 12/2006 |
| JP | 2006-344156 A | 12/2006 |
| JP | 2007-287078 A | 11/2007 |
| WO | WO 03/036900 A2 | 5/2003 |

OTHER PUBLICATIONS

NPL "Managing Personal Information Disclosure in Ubiquitous Computing Environments" (Jun. 2003) by Scott Lederer; 19 pages; originally downloaded from http://www.intel-research.net/Publications/Berkeley/070920030922_139.pdf.*

(Continued)

*Primary Examiner* — Kambiz Zand
*Assistant Examiner* — Ali Shayanfar
(74) *Attorney, Agent, or Firm* — Fujitsu Patent Center

(57) ABSTRACT

A personal-information managing apparatus includes: a usage permission policy managing unit to manage usage permission policy in which a boundary between usage permission and usage prohibition of personal information is defined; a personal information request receiving unit to receive a request for the personal information from the personal-information handling apparatus; a usage-permission issuing unit to obtain the usage permission policy corresponding to the received request via the usage permission policy managing unit, and to issue a usage permit corresponding to the usage permission policy and the requested personal information to the personal-information handling apparatus; a usage permit issue history managing unit to manage the issued usage permit and usage permission issue history relating to the personal information; and a credibility establishing unit to establish credibility of information exchange with the personal-information handling apparatus in relation to the issuing of the usage permit and the personal information.

8 Claims, 20 Drawing Sheets

(56) References Cited

OTHER PUBLICATIONS

"Korean Office Action" mailed by KPO and corresponding to Korean application No. 10-2009-0090465 on Mar. 16, 2012, with English translation.

Japanese Office Action dated Dec. 18, 2012, issued in corresponding Japanese Patent Application No. 2008-258793.
Japanese Office Action mailed Oct. 2, 2012 for corresponding Japanese Application No. 2008-258793, with English-language Translation.

* cited by examiner

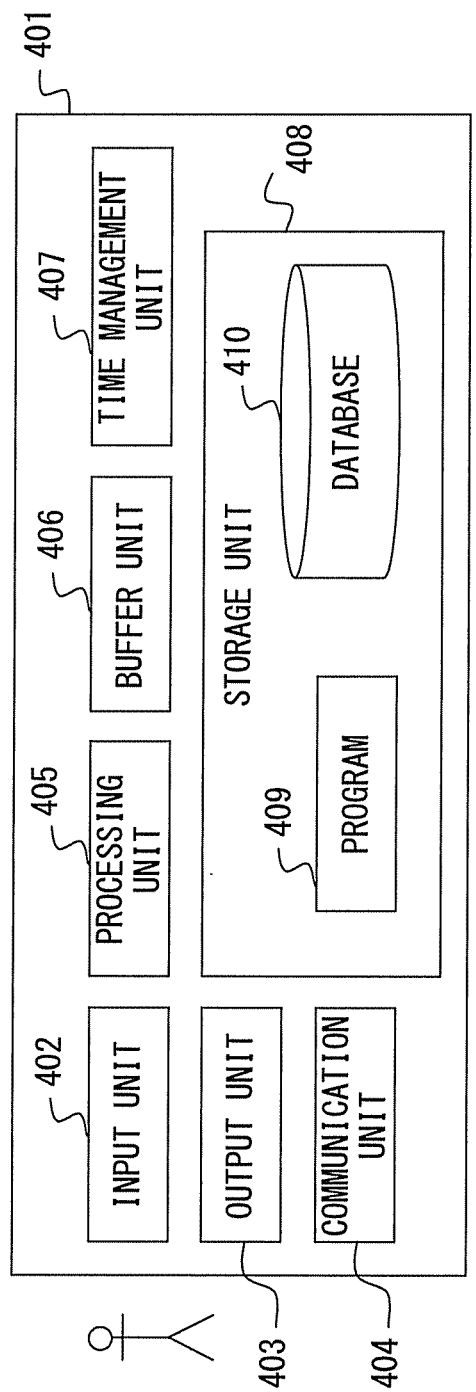
F I G. 4

| TYPE OF PERSONAL INFORMATION | REGISTERED CONTENT |
|---|---|
| LAST NAME | "山田" ("YAMADA" IN ENGLISH) |
| FIRST NAME | "太郎" ("TARO" IN ENGLISH) |
| NAME | 姓+名 (FIRST NAME AND LAST NAME IN ENGLISH) |
| Last name | "Yamada" |
| First name | "Taro" |
| Name | First name + Last name |
| Credit Name | ALL CAPITAL LETTER (FIRST NAME)<br>+ALL CAPITAL LETTER (LAST NAME) |
| ... | |
| I4 | hoge |
| I5 | hoge001 |
| ... | |

F I G.  1 2

| POLICY CLASSIFICATION | POLICY NAME OF USAGE PERMISSION | POLICY ISSUE DESTINATION | CONTENTS OF PERSONAL INFORMATION TO BE ISSUED |
|---|---|---|---|
| REGISTRATION | USER REGISTRATION | System.appli.*:USER REGISTRATION | LAST NAME, FIRST NAME, POSTAL CODE, ADDRESS 1, TELEPHONE NUMBER 1 |
| ONLINE SHOPPING | BASIC INFORMATION | System.appli.BROWSER. http://*.co.jp/:CUSTOMER INFORMATION | NAME, ADDRESS, TELEPHONE NUMBER |
| ONLINE SHOPPING | CREDIT CARD INFORMATION | System.appli.BROWSER. http://*.co.jp/:PAYMENT INFORMATION System.appli.BROWSER. http://*.co.jp/:PAYMENT METHOD | CARD TYPE, CREDIT NAME, EXPIRY DATE OF CARD |
| ... | | | |

F I G. 1 3

| POLICY CLASSIFICATION | POLICY NAME OF USAGE PROHIBITION | POLICY ISSUE DESTINATION | CONTENTS OF PERSONAL INFORMATION TO BE ISSUED |
|---|---|---|---|
| ONLINE SHOPPING | BASIC INFORMATION | System.appli.BROWSER. http://*.co.jp/:CUSTOMER INFORMATION | MOBILE PHONE NUMBER |
| ... | | | |

F I G. 1 4

| DATE AND TIME | ISSUE DESTINATION | PUBLIC KEY PASSED TO ISSUE DESTINATION | PUBLIC KEY RECEIVED FROM ISSUE DESTINATION | ISSUED CONTENTS OF PERSONAL INFORMATION | ISSUING PERSONAL INFORMATION | EXPIRY DATE AND TIME OF PERMISSION |
|---|---|---|---|---|---|---|
| 2008/2/1 14:00 | System.appli. PAINTING SOFTWARE: USER REGISTRATION | P (CORRESPONDING SECRET KEY IS "S") | P1 (CORRESPONDING SECRET KEY IS "S1") | LAST NAME, FIRST NAME, POSTAL CODE, ADDRESS 1, TELEPHONE NUMBER 1 | S(P1(LAST NAME)), S(P1(FIRST NAME)), S(P1(POSTAL CODE)), S(P1(ADDRESS 1)), S(P1(TELEPHONE NUMBER 1)) | 2008/2/1 14:30 |
| 2008/2/2 5:30 | System.appli. BROWSER. http://mail.hoo.co.jp/:PASSWORD INPUT | P | P2 | I5 | S(P2(I5)) | 2008/2/2 6:00 |
| 2008/2/2 5:40 | System.appli. BROWSER. http://www.foobookstore.co.jp/:CUSTOMER INFORMATION | P | P3 | NAME, ADDRESS, TELEPHONE NUMBER | S(P3(NAME)), S(P3(ADDRESS)), S(P3(TELEPHONE NUMBER)) | 2008/2/2 6:10 |
| 2008/2/2 5:43 | System.appli. BROWSER. http://www.foobookstore.co.jp/:PAYMENT METHOD | P | P3 | CARD TYPE, CREDIT NAME, EXPIRY DATE OF CARD | S(P3(CARD TYPE)), S(P3(CREDIT NAME)), S(P3(EXPIRY DATE OF CARD)) | 2008/2/2 6:13 |
| ... | | | | | | |

FIG. 15

| POLICY CLASSIFICATION | POLICY NAME OF USAGE PERMISSION | POLICY ISSUE DESTINATION | CONTENTS OF PERSONAL INFORMATION TO BE ISSUED |
|---|---|---|---|
| PREDICTION CLASSIFICATION | PREDICTION NAME 1 | System.appli.BROWSER. http://mail.hoo.co.jp /:PASSWORD INPUT | I5 |
| ... | | | |

FIG. 16

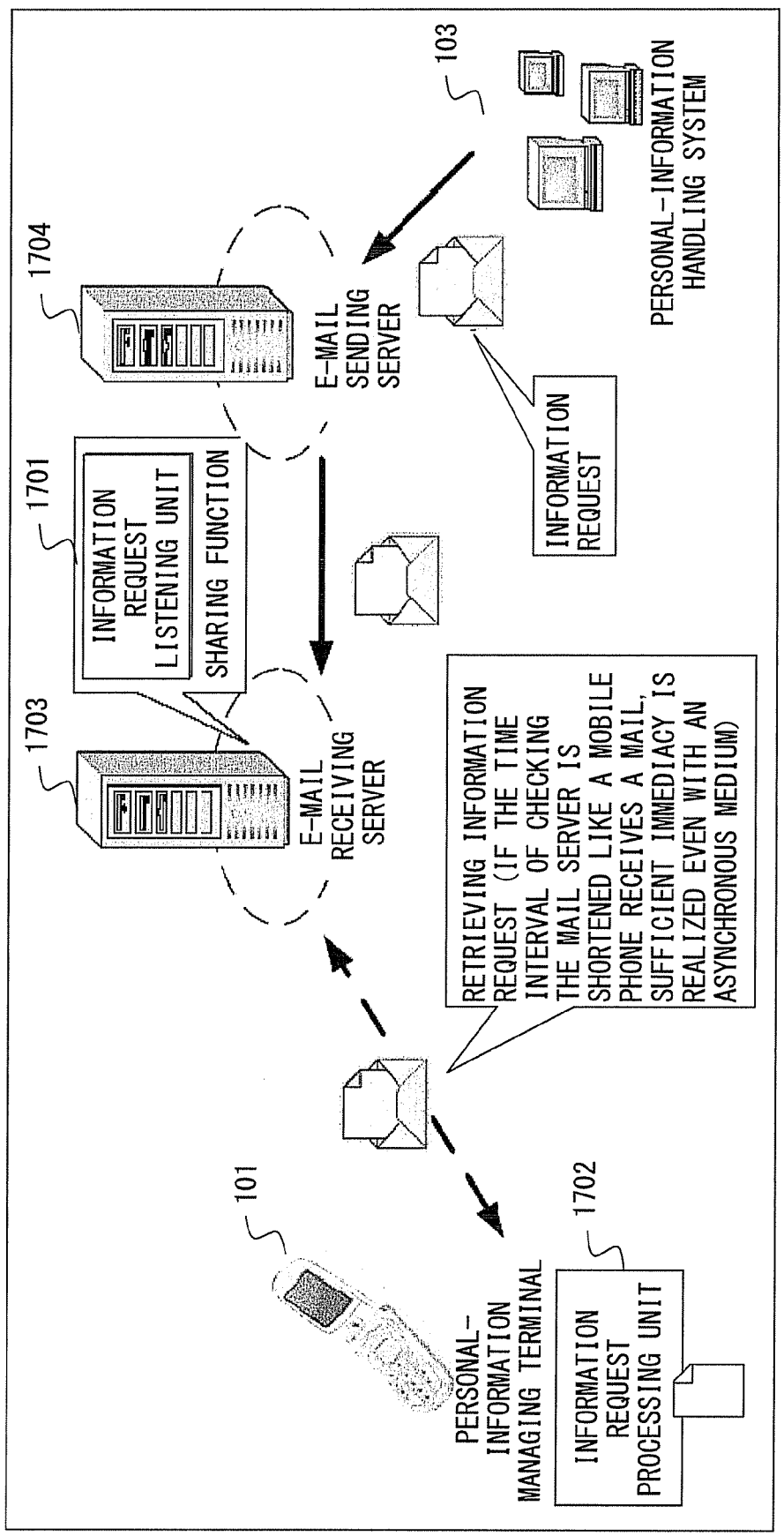
F I G. 17

PERSONAL-INFORMATION MANAGING APPARATUS AND PERSONAL-INFORMATION HANDLING APPARATUS

CROSS REFERENCE TO RELATED APPLICATIONS

This application is based upon and claims the benefit of priority of the prior Japanese Patent Application No. 2008-258793, filed on Oct. 3, 2008, the entire contents of which are incorporated herein by reference.

FIELD

The present invention relates to a personal information management for providing personal information with the consent of a user.

BACKGROUND

When services are used via mobile phones or individual-use personal computers, there are occasions in which various kinds of information such as name, address, telephone number, e-mail address, or age are required to be input. However, once such information have been given to a service provided, it is difficult to control who uses the information for what purpose, or how it may be used.

For example, suppose that a user purchases a book via internet shopping. At the online site of Bookshop A, the user inputs his/her personal information. However, such information is sent to shipping company B and/or payment and settlement company C, and the user cannot control what information is passed to what company. Also, if the user did not input contact information in order to avoid receiving direct mail from Bookshop A, shipping company B cannot know the contact information (such as e-mail address) of the user even for the purpose of confirming whether the user is at home. Moreover, even if the user wants to order a book that is not available at Bookshop A from Bookshop B and the personal information to be input and the disclosure policy of personal information are the same, the user has to input the same information to the online site of Bookshop B as well.

One method that manages personal information in a unified way and enables a single sign-on while maintaining concealing against a number of services in accordance with the policy of a user for disclosing personal information has been proposed (for example, Japanese Laid-open Patent Publication No. 2004-260716).

This method includes a procedure that maintains concealing of personal information in a communication channel by sending the personal information encrypted with a public key of the service to which the personal information is provided. According to this method, the policy for personal information disclosure can be set by assigning the information to be disclosed for each service, and the disclosure of personal information in accordance with this policy is possible.

However, the prior art of personal information management has a problem wherein the user cannot confirm or control the addresses for distribution by himself/herself.

In addition, the prior art has a problem wherein, when a number of services cooperate with each other and there is a piece of personal information lacking during those services, an inquiry about the personal information of the user cannot be independently made from the service provider side.

Furthermore, the prior art has a problem wherein, even when providing similar personal information from the same terminal, the user has to specify or input the same information every time as long as it is for a different service.

SUMMARY

A personal-information managing apparatus for inputting or storing personal information so as to issue the input or stored personal information to a personal-information handling apparatus according to one aspect of the invention, includes: a usage permission policy managing unit configured to manage usage permission policy in which a boundary between usage permission and usage prohibition of the personal information is defined; a personal information request receiving unit configured to receive a request for the personal information from the personal-information handling apparatus; a usage-permission issuing unit configured to obtain the usage permission policy corresponding to the received request via the usage permission policy managing unit, and to issue a usage permit corresponding to the usage permission policy and the requested personal information to the personal-information handling apparatus; a usage permit issue history managing unit configured to manage the issued usage permit and usage permission issue history relating to the personal information; and a credibility establishing unit configured to establish credibility of information exchange with the personal-information handling apparatus in relation to the issuing of the usage permit and the personal information.

A personal-information handling apparatus for requesting and obtaining personal information from a personal-information managing apparatus to use the obtained personal information according to one aspect of the invention, including: a personal information requesting unit configured to request necessary personal information from the personal-information managing apparatus; a personal information obtaining unit configured to receive a usage permit designating a usage permission policy in which a boundary of usage permission or usage prohibition of the personal information is defined, and to receive the requested personal information; a credibility establishing unit configured to establish credibility of information exchange with the personal-information managing apparatus in relation to the requesting or receiving of the personal information and the usage permit; and a personal information processing unit configured to interpret the usage permission policy designated by the received usage permit, and to use the personal information on the basis of the interpreted result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a system configuration example of an individual-use personal computer implementing a personal-information managing terminal of FIG. 1.

FIG. 12 is a diagram illustrating a registered data example of personal information.

FIG. 13 is a diagram illustrating a registered data example of a usage permission policy.

FIG. 14 is a diagram illustrating a registered data example of a usage prohibition policy.

FIG. 15 is a diagram illustrating a registered data example of a usage permission issue history.

FIG. 16 is a diagram illustrating a registered data example of a usage permission prediction policy.

FIG. 17 is a system implementation example in which an information request listening function is implemented on an external already-existing server apart from a personal information managing terminal.

DESCRIPTION OF EMBODIMENTS

Some embodiments will be described in detail with reference to the accompanying drawings. The embodiments described in the following are for enabling a user to directly understand what information is provided to what service in a case where a number of services cooperate with each other, and this is achieved by a configuration in which personal information and the usage permission policy of the personal information are provided to each service and thereby the user specifies the usage condition of personal information for a service to which the personal information is provided or for a service subcontracted to that service to which the personal information is provided.

The embodiments described below are also for increasing user convenience such that the user does not have to input same personal information repeatedly to similar services when same personal information needs to be provided to a different service, and this is achieved by predicting the usage permission policy of the personal information by means of the past history.

In the first embodiment, a personal-information managing system and a personal-information handling system are implemented in the terminal that a user uses.

Figure 1:
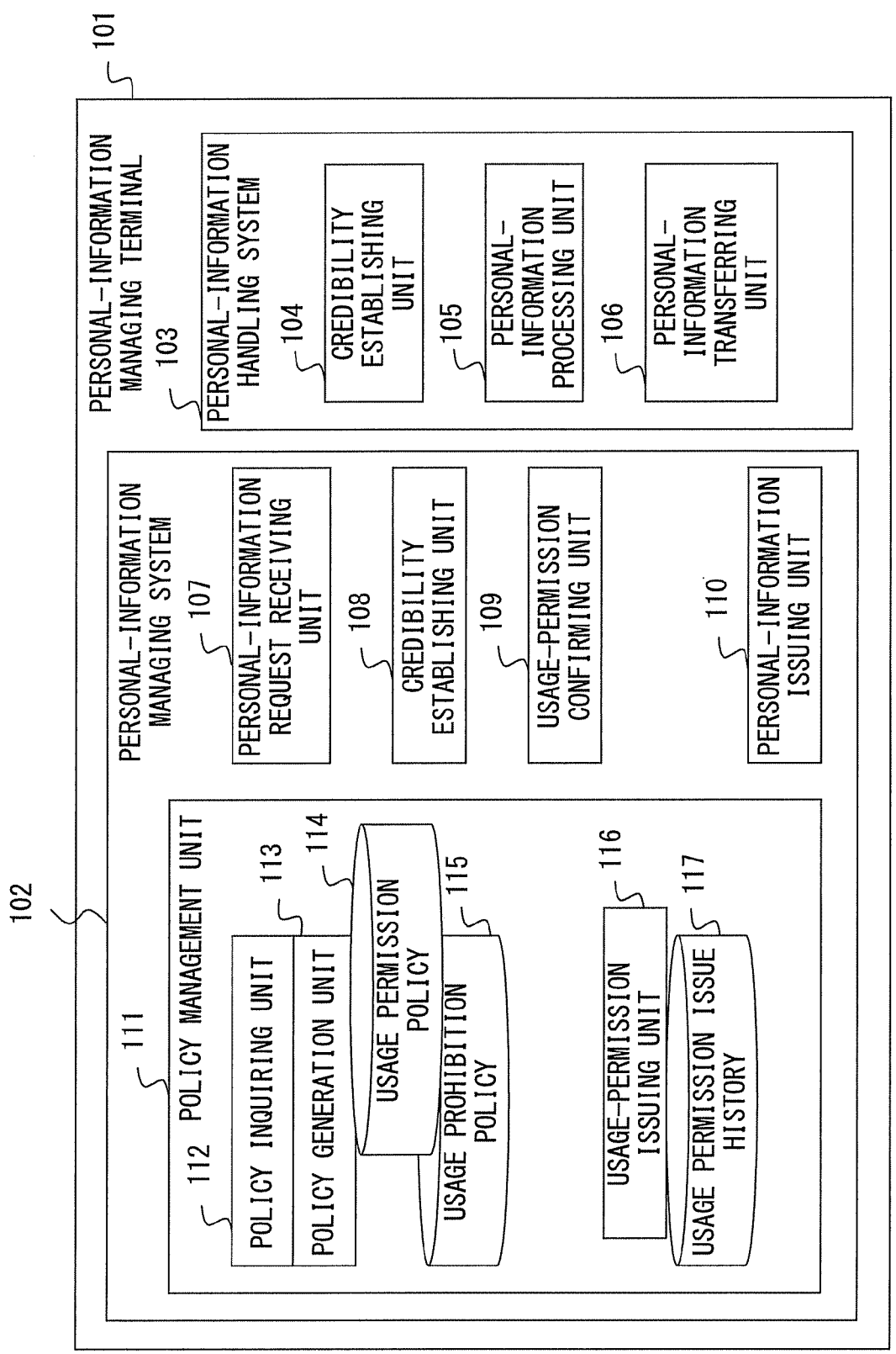
FIG. 1 is a diagram illustrating a system configuration example according to a first embodiment.
Figure 2:
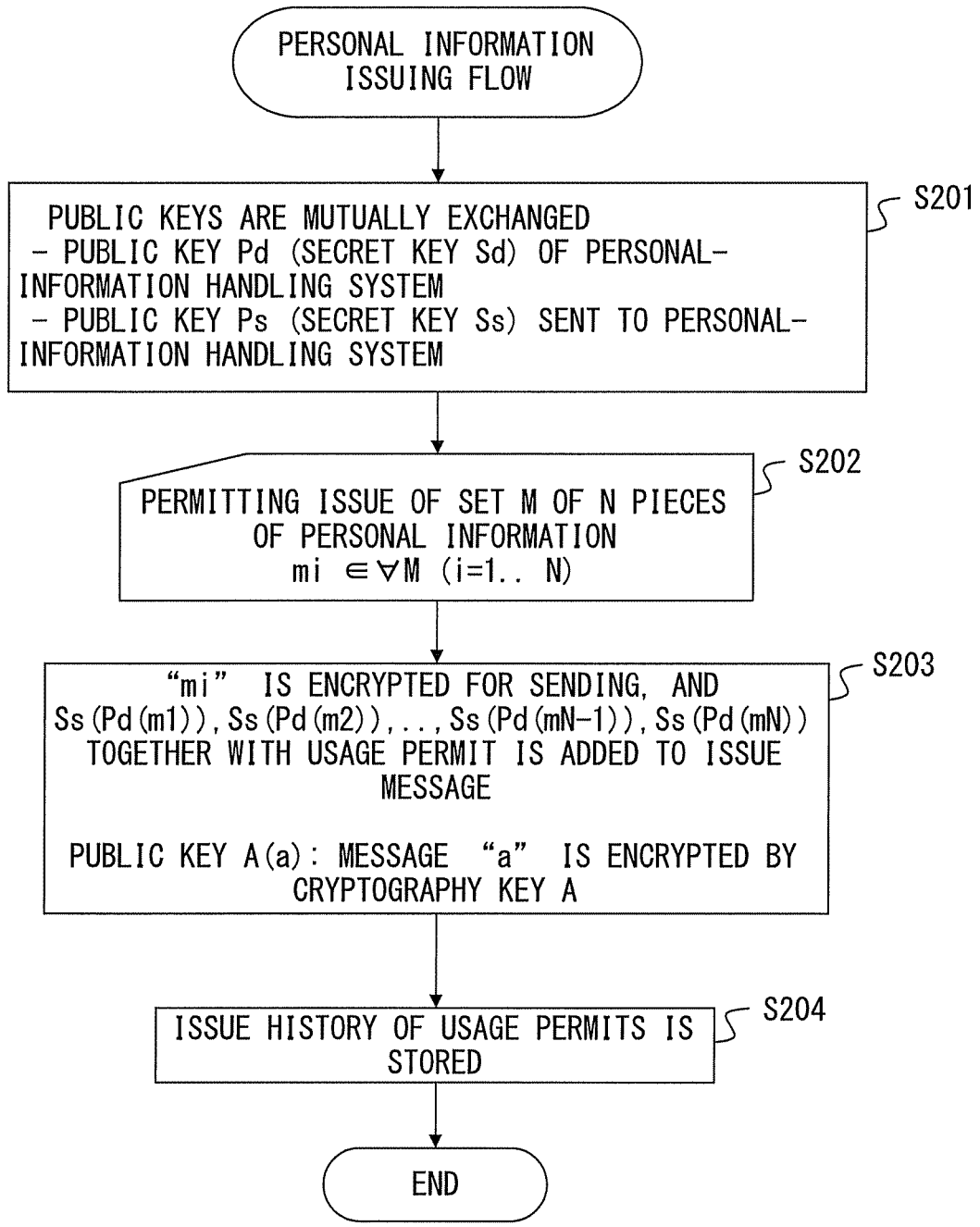
FIG. 2 is a flowchart illustrating a personal-information issuing process executed by a personal-information managing system of FIG. 1.
Figure 3:
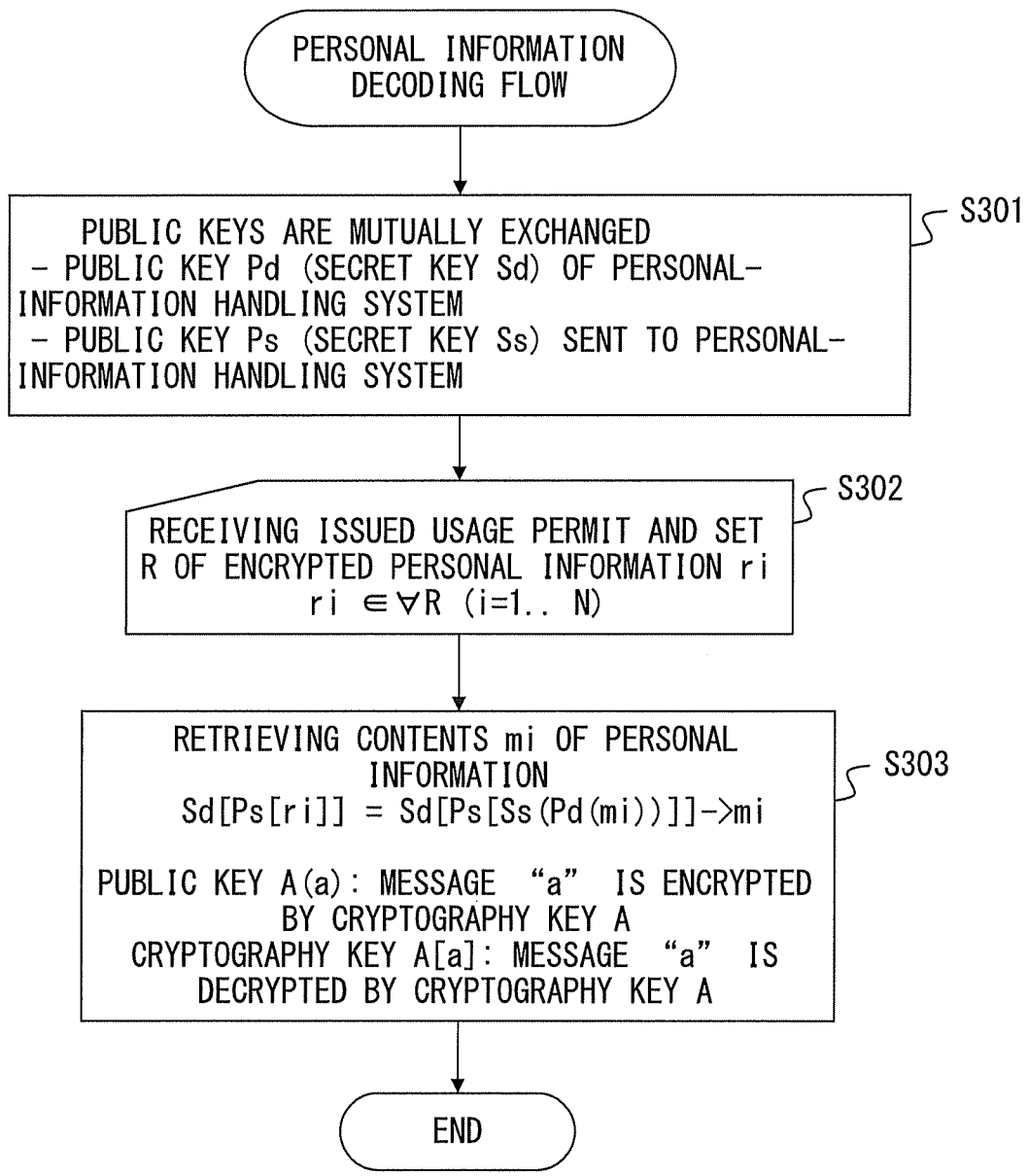
FIG. 3 is a flowchart illustrating a personal-information decrypting process performed by a personal-information handling system of FIG. 1.

FIG. 1 is a diagram illustrating a system configuration example according to the first embodiment. FIG. 2 is a flowchart illustrating personal-information issuing process executed by a personal-information managing system 102 of FIG. 1. FIG. 3 is a flowchart illustrating personal-information decrypting process executed by a personal-information handling system 103 of FIG. 1.

In FIG. 1, a user uses a personal-information handling system 103 on a personal-information managing terminal 101, where a personal-information managing system 102 is also on the personal-information managing terminal 101.

A personal-information processing unit 105 in the personal-information handling system 103 requests personal information by requiring the user to input personal information.

The personal-information managing system 102 receives a personal information request at a personal-information request receiving unit 107.

Then, before passing the personal information, a credibility establishing unit 108 in the personal-information managing system 102 establishes credibility with a credibility establishing unit 104 in the personal-information handling system 103. Specifically, a public key for mutually performing encrypted communications via the public key cryptosystem is exchanged (S201 in FIG. 2, S301 in FIG. 3). In other words, public key Pd (corresponding secret key (cryptography key) is Sd) is issued from the personal-information handling system 103 to the personal-information managing system 102. On the other hand, public key Ps (corresponding secret key is Ss) is issued from the personal-information managing system 102 to the personal-information handling system 103.

A usage-permission confirming unit 109 in the personal-information managing system 102 confirms a usage permission with the user as required. Specifically, the following processes are executed in a policy management unit 111.

First, a policy inquiring unit 112 determines whether the personal information is permitted or prohibited to be issued to the personal-information handling system 103 by making an inquiry to a usage permission policy 114 and a usage prohibition policy 115.

Next, based on a result of inquiry made by the policy inquiring unit 112, a usage-permission issuing unit 116 confirms the personal information with the user as required in the form of FIG. 12 while referring to the usage permission policy 114, permits to handle the personal information for a service that handles the personal information, and issues a usage permit that is issued as the certificate (S202 in FIG. 2). The usage permission policy 114 includes the information of what information is permitted to what issue destination, and includes the registered content such as policy classification, usage permission policy name, policy issue destination, or personal information to be issued, as illustrated in FIG. 13. A usage prohibition policy 115 also has a registered format, similar to the usage permission policy 114, as illustrated in FIG. 14. The usage permit is created by reformatting the usage permission policy 114 for the purpose of distribution.

A personal-information issuing unit 110 in the personal-information managing system 102 obtains Pd(mi) ($1 \leq i \leq N$) by encrypting N pieces of personal information (N is a natural number equal to or larger than 1) whose issuance is permitted by the usage-permission issuing unit 116 in set M={mi|1≤i≤N} with a public key Pd issued from the personal-information handling system 103. Then the personal-information issuing unit 110 obtains Ss(Pd(mi)) (1≤i≤N) by encrypting the obtained personal information with a secret key Ss of the personal-information managing system 102, and sends the encrypted personal information to the personal-information handling system 103 together with the usage permit of the personal information (S203 in FIG. 2). The usage permit may be encrypted together with the personal information.

When issuing the usage permit, the usage-permission issuing unit 116 records the issue history of usage permits (S204 in FIG. 2) in the usage permission issue history 117. The usage permission issue history 117 includes the registered content such as date, issue destination, public key passed to the issue destination, issued personal information, personal information to be issued, or permission expiration date, as illustrated in FIG. 15.

In response to the control processes of the personal-information managing system 102, the personal-information processing unit 105 in the personal-information handling system 103, which receives the personal information, receives the usage permit issued by the personal-information managing system 102, and sets R={ri|1≤i≤N} having N pieces of encrypted personal information ri (S302 in FIG. 3)

Then, the personal-information processing unit 105 obtains Ps(ri) (1≤i≤N) by decoding the pieces of encrypted data ri(1≤i≤N) with public key Ps sent from the personal-information managing system 102, and obtains Sd(Ps (ri)) (1≤i≤N) by decoding the obtained data with secret key Sd of the personal-information handling system 103. By so doing, N pieces of personal information mi(1≤i≤N) issued from the personal-information managing system 102 (S303 in FIG. 3) are extracted. This is represented by the following equation.

$$Sd(Ps(ri)) = Sd(Ps(Ss(Pd(mi))))$$
$$= Sd(Pd(mi))$$
$$= mi$$

The user may preliminarily generate the personal information, the usage permission policy 114, or the usage prohibition policy 115, by means of a policy generation unit 113. If the personal information is also managed by another system, the personal information may be linked to the system.

FIG. 4 is a diagram illustrating a system configuration example of an individual-use personal computer realizing a personal-information managing terminal 101 of FIG. 1.

In an individual-use personal computer 401 of FIG. 4, an input unit 402 is, for example, a keyboard or a mouse that accepts an input of the personal information or usage permission/prohibition from the user.

An output unit 403 is, for example, a display device that displays the personal information, inquiry information of usage permission/prohibition, or the like.

A communication unit 404 provides a connecting function to the internet or the like.

A processing unit 405 is, for example, a central processing unit (CPU) that loads a program 409 stored in a storage unit 408 comprised of a hard disk drive or the like into a buffer unit 406 comprised of a semiconductor memory or the like and executes the program. The processing unit 405 provides a function such as the personal-information managing system 102 and the personal-information handling system 103 of FIG. 1.

A time management unit 407 manages a recorded time of the usage permission issue history 117 or the like.

A database 410 stores the usage permission policy 114, the usage prohibition policy 115, the usage permission issue history 117, or the like, of FIG. 1.

In an individual-use personal computer, an input of the personal information is often required, especially for the user registration of software. For the sake of saving the user time and trouble, the software that includes the personal-information handling system 103 of FIG. 1 does not just inquire about the personal information directly with the user but inquires with the personal-information managing system 102 of FIG. 1.

It is desirable that the credibility establishment between the above systems 102 and 103 be made even when only closed communication is executed in one personal computer. The encryption method used in that credibility establishment is desirably a method such as a public key cryptosystem capable of restricting a system that can read the personal information, since the method is used when the personal information is issued.

In the first embodiment, the personal-information handling system 103 to which usage permission is firstly given leaves the usage permission issue history 117. This history is used for generating a usage permission prediction policy.

The usage permission policy 114 of the personal information permitted at the time of software user registration is sometimes entirely the same for each person. In the present system, the usage permission is not confirmed with the user every time and a new usage permission policy 114 is not generated. The present system is configured such that the usage permission with some kind of rules in the usage permission issue history 117 is stored as a usage permission prediction policy separately in the database 410 or the like. When same personal information is requested from the personal-information handling system 103, the prediction policy is used. FIG. 16 illustrates a registered data example of such a usage permission prediction policy.

In the first embodiment, when the usage of personal information is permitted to a personal-information handling system 103 (FIG. 1), since a usage permit is issued, it may be configured such that, when the personal information is processed for the second time or later, the personal-information handling system 103 requests the personal information by presenting the issued usage permit to the personal-information managing system 102.

The function of a personal-information transferring unit 106 will be referred to in the description of a third embodiment.

Figure 5:
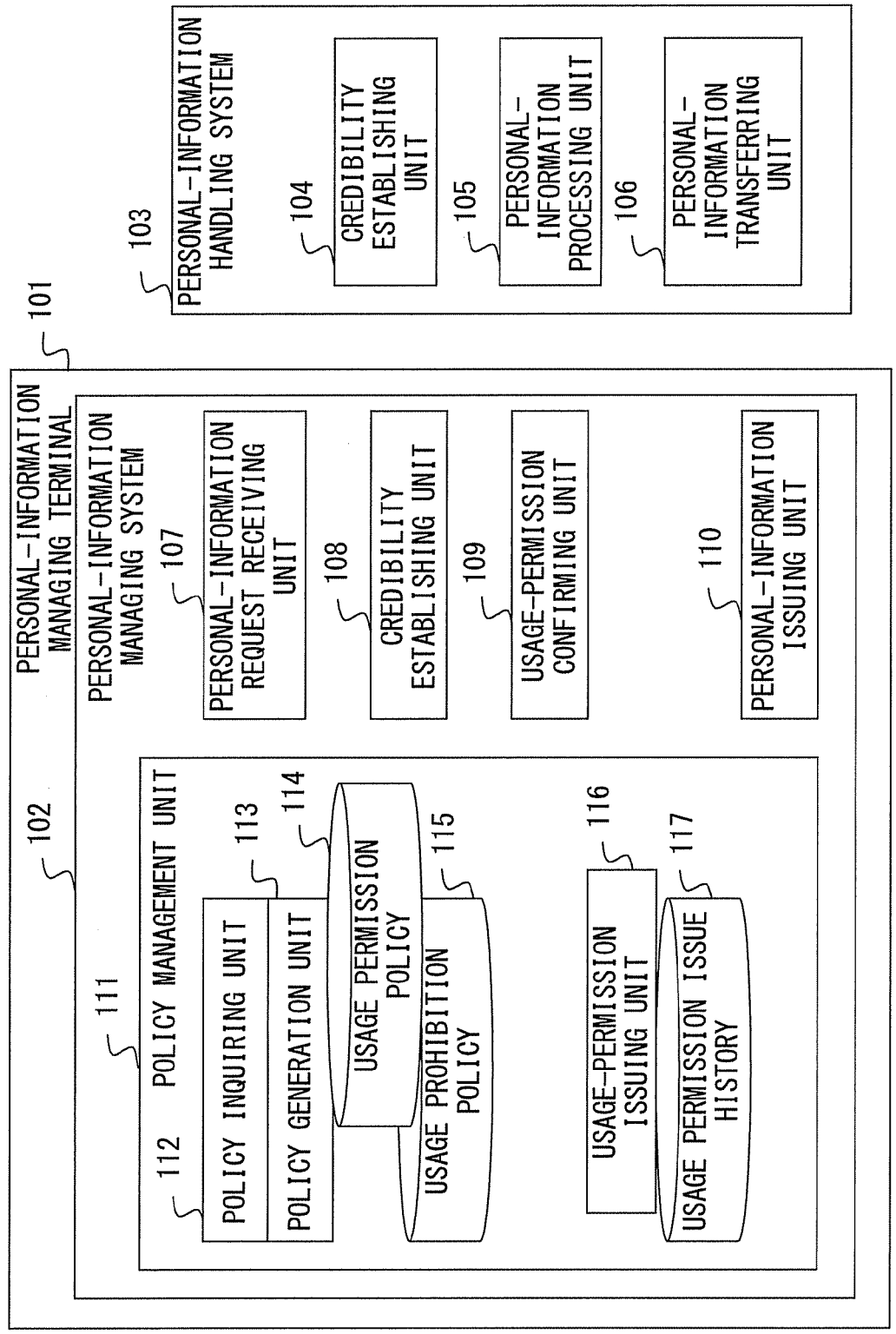
FIG. 5 is a diagram illustrating a system configuration example according to a second embodiment.

FIG. 5 is a diagram illustrating a system configuration example according to the second embodiment.

The configurations of FIG. 5 are different from those of FIG. 1 in that the personal-information handling system 103 is arranged at a location different from the personal-information managing terminal 101 in which the personal-information managing system 102 is installed on, for example, a server device or the like. The personal-information handling system 103 and personal-information managing system 102 communicate through a communication channel such as the Internet. The configurations of FIG. 1 and FIG. 5 are the same in the other respects.

In the case of the personal-information managing terminal 101 is, for example, a mobile phone, some websites display a form in which personal information should be filled when personal information is to be input on the mobile phone. At the web server in which the personal-information handling system 103 is incorporated, credibility is established in a similar manner as the first embodiment, and the personal information is exchanged if there is no problem with that credibility establishment.

In the personal-information managing terminal 101, as in the first embodiment, it is determined whether the usage permission policy 114 or usage permission prediction policy can be used, and when the already-existing policy cannot be used, it is confirmed with the user whether the personal information may be provided in order to generate a new policy. When the use of the personal information is permitted (by the user), the personal information is issued while the usage permission issue history 117 is recorded.

The personal-information handling system 103 at the server side can prove that it is the correct user of the personal information through the usage permit, as in the first embodiment. However, there are cases in which the usage permit has an expiry date. Thus, after that expiry date has expired, the personal information needs to be requested again even if it is the personal information to which the usage permit was once given.

The third embodiment is now described. In the third embodiment, the personal-information handling system 103 that has received the personal information can transfer that personal information to another personal-information handling system 103.

Figure 6:
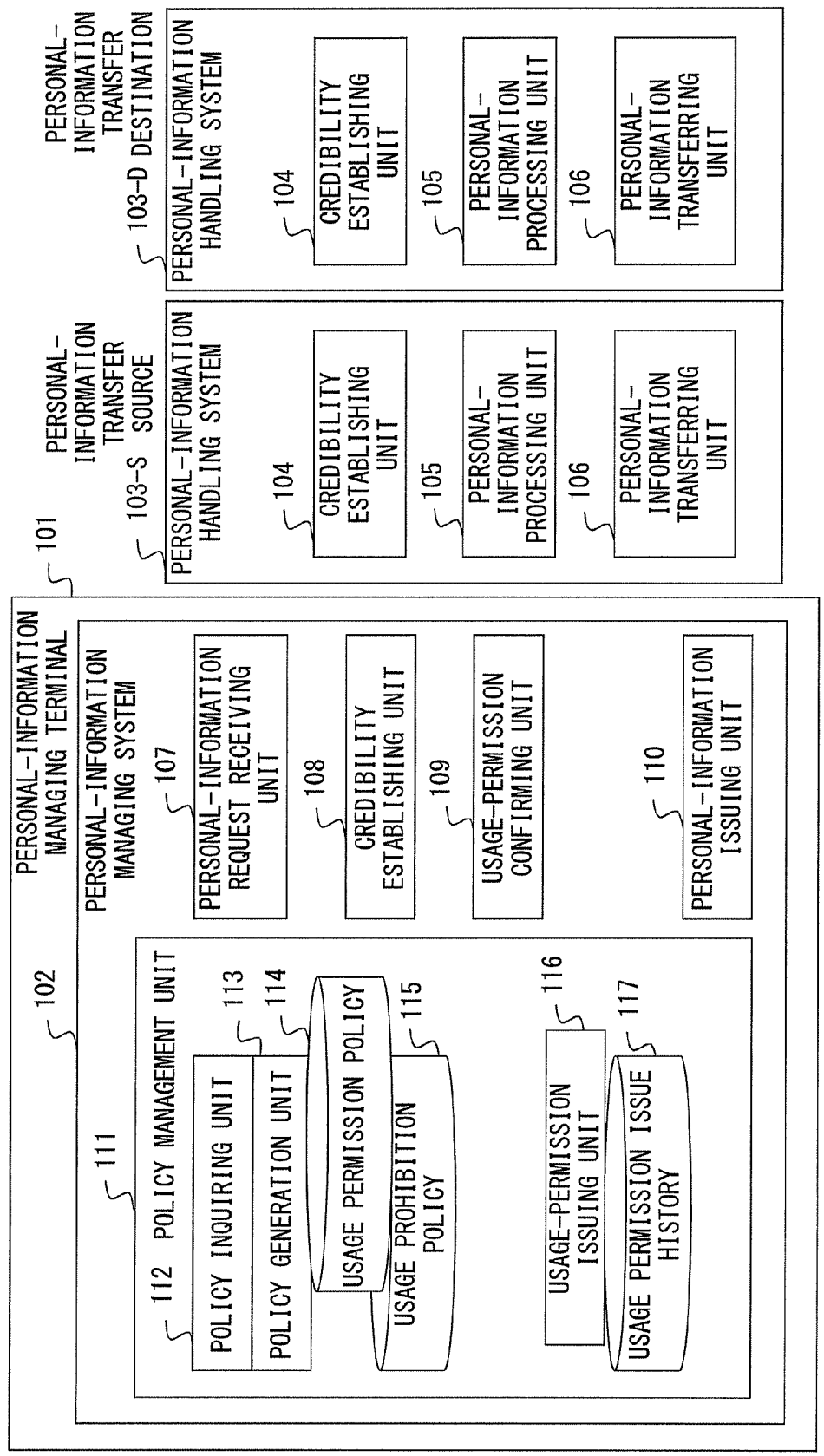
FIG. 6 is a diagram illustrating a system configuration example according to a third embodiment.

In the third embodiment, as illustrated in FIG. 6, the personal information can be transferred from a personal-information handling system 103-S of a transfer source to a personal-information handling system 103-D of a transfer destination. In this case, the personal-information handling system 103-S of a transfer source may be on the personal-information managing terminal 101 at which the personal-information managing system 102 is located similar to the first embodiment (FIG. 1), or may be on a server or the like different from the personal-information managing terminal 101 similar to the second embodiment (FIG. 5). The personal-information handling system 103-D of a transfer destination is configured on a server or the like that is different from the personal-information managing terminal 101.

For example, the personal-information handling system 103-S of a transfer source configured on a server of an online bookstore transfers the personal information received from a user such as an address, name, or contact address to the personal-information handling system 103-D of a transfer destination configured on a server of a shipping company.

Figure 7:
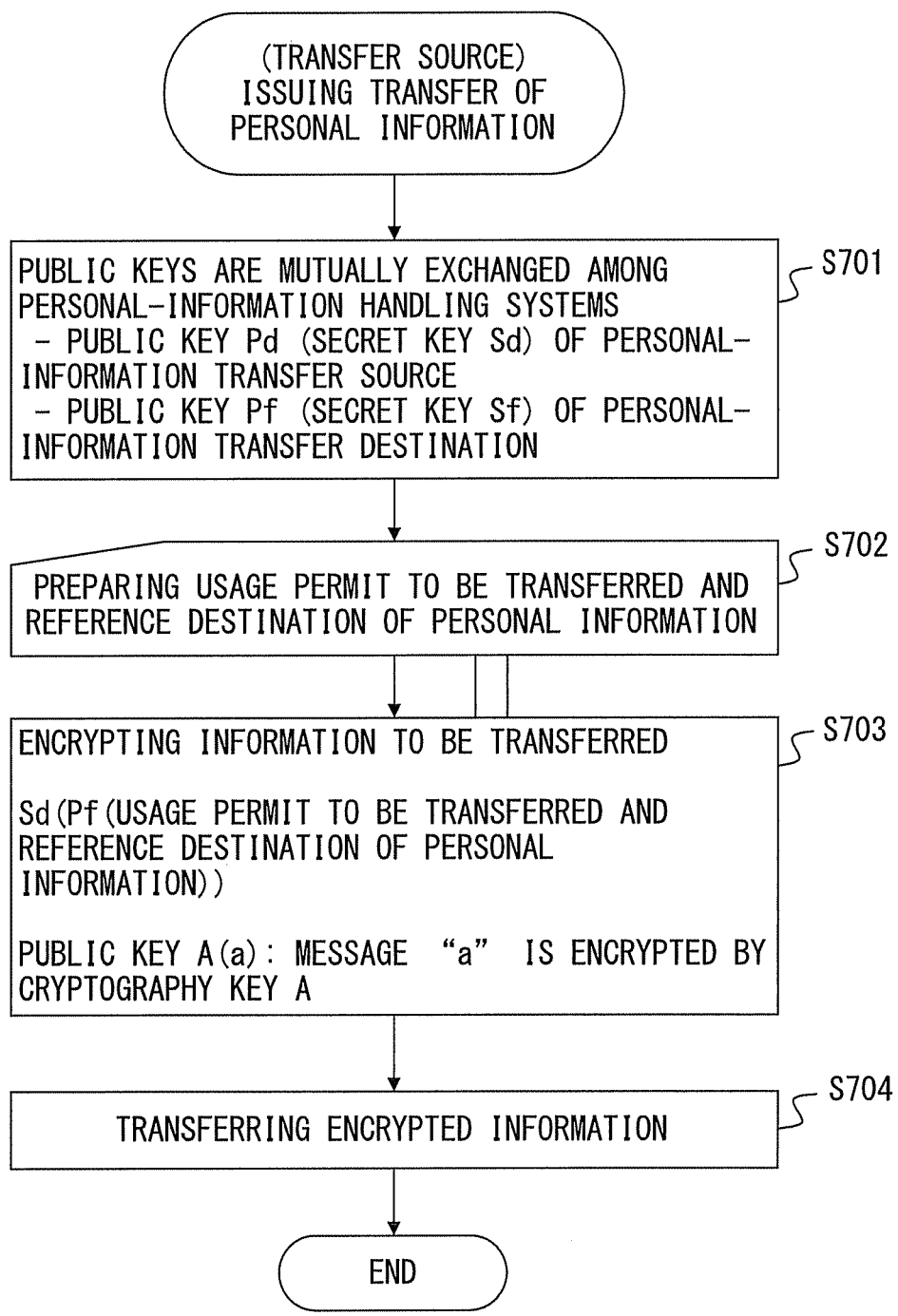
FIG. 7 is a flowchart illustrating a control of the process of issuing a transfer of personal information, which is executed by a personal-information handling system of a transfer source.

FIG. 7 is a flowchart illustrating a control of the process of issuing a transfer of personal information, executed by the personal-information handling system 103-S of the transfer source. In the following description, FIG. 7 and FIG. 6 are to be referred to as necessary.

First, before issuing the transfer of the personal information, the credibility establishing unit 104 in the personal-information handling system 103-S of a transfer source exchanges public keys to establish credibility with the credibility establishing unit 104 in the personal-information handling system 103-D of the transfer destination (S701 in FIG. 7). That is, a public key Pd (corresponding secret key is Sd) is issued from the transfer source to the transfer destination, and in the opposite direction, a public key Pf (corresponding secret key is Sf) is issued from the transfer destination to the transfer source.

Next, the personal-information transferring unit 106 in the personal-information handling system 103-S of a transfer source prepares the usage permit received from the personal-information managing terminal 101 to be transferred and also prepares a reference destination of the personal information to specify the personal-information managing terminal 101 (S702 in FIG. 7). The reference destination of the personal information is, for example, a telephone number, an IP (internet protocol) address, an e-mail address, or the like that are directly accessible to the personal-information managing terminal 101.

The personal-information transferring unit 106 of the transfer source encrypts the usage permit and the reference destination of the personal information that are prepared in step S702 with the public key Pf issued from the transfer destination to obtain following encrypt information. Pf (usage permit to be transferred and reference destination of personal information). Then the personal-information transferring unit 106 of the transfer source further encrypts the obtained encrypted information with the secret key Sd of the transfer source to obtain following encrypt information. Sd (Pf (usage permit to be transferred and reference destination of personal information)) (S703 in FIG. 7).

Then, the personal-information transferring unit 106 of the transfer source sends the above encrypted information to the personal-information handling system 103-D of the transfer destination (S704 in FIG. 7).

Figure 8:
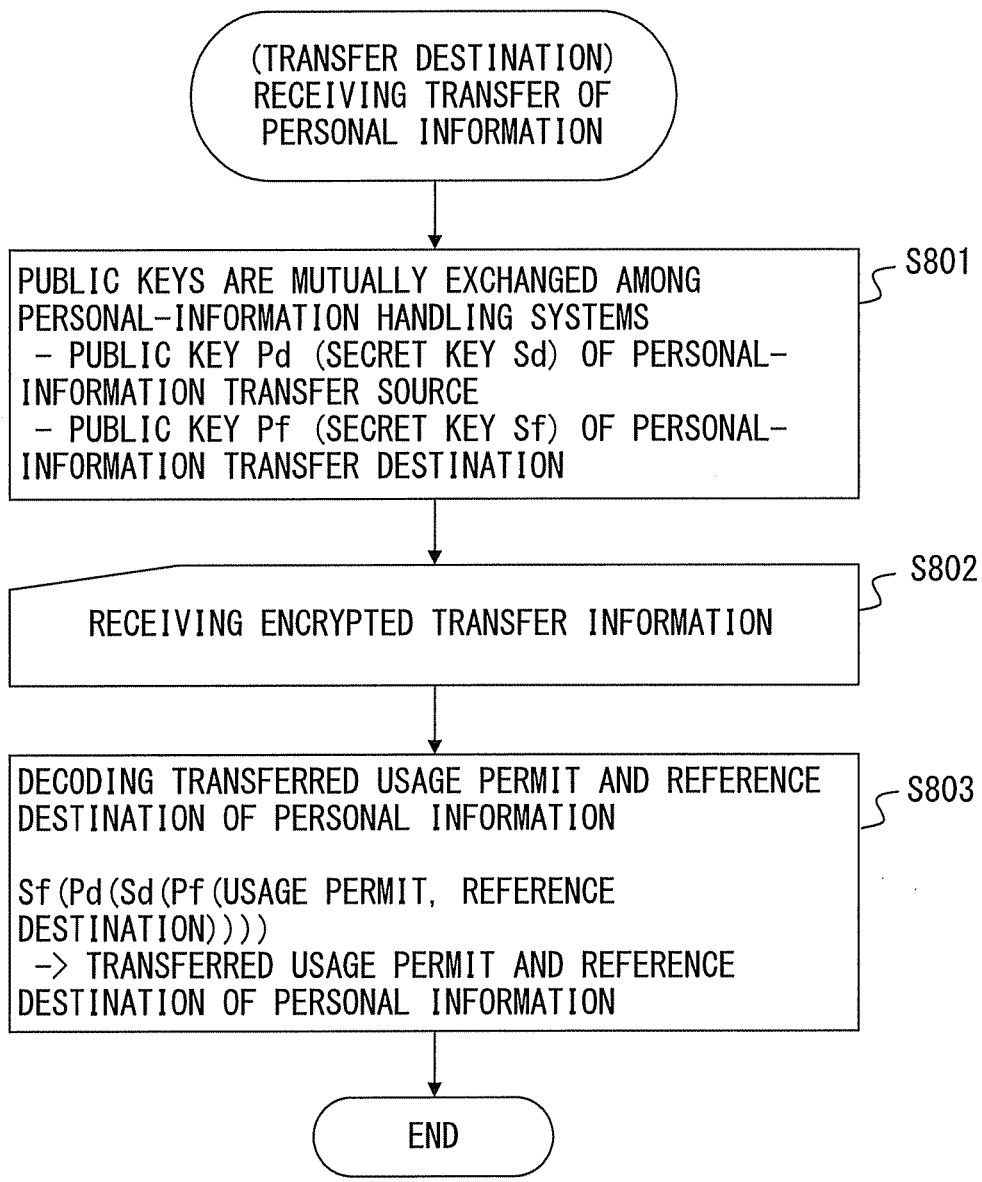
FIG. 8 is a flowchart illustrating a control of the process of receiving a transfer of personal information, which is executed by a personal-information handling system of a transfer destination.

FIG. 8 is a flowchart illustrating a control of the process of receiving a transfer of personal information, executed by the personal-information handling system 103-D of the transfer destination. In the following description, FIG. 8 and FIG. 6 are to be referred to as necessary.

First, before receiving the transfer of the personal information, in a similar manner as the credibility establishing unit 104 of the transfer source (S701 in FIG. 7), the credibility establishing unit 104 in the personal-information handling system 103-S of the transfer source exchanges public keys to establish credibility with the credibility establishing unit 104 in the personal-information handling system 103-D of the transfer destination (S801 in FIG. 8).

Next, the personal-information transferring unit 106 in the personal-information handling system 103-D of the transfer destination receives the encrypted transfer information sent from the personal-information handling system 103-S of a transfer source (S802 in FIG. 8).

Then, the personal-information transferring unit 106 of the transfer destination firstly decodes the above encrypted transfer information with the public key Pd issued from the personal-information handling system 103-S of the transfer source, and then further decodes the decoded information with the secret key Sf of the personal-information handling system 103-D of the transfer destination, thereby decoding the transferred usage permit and the reference destination of the personal information which are issued by the personal-information handling system 103-S of the transfer source (S803 in FIG. 8).

As described above, the personal-information handling system 103-D of the transfer destination can receive the transfer of the usage permit that the personal-information handling system 103-S of the transfer source received from the personal-information managing terminal 101. The personal-information handling system 103-D of the transfer destination can request the content of the personal information necessary for itself from the personal-information managing terminal 101 by means of the transferred usage permit.

Figure 9:
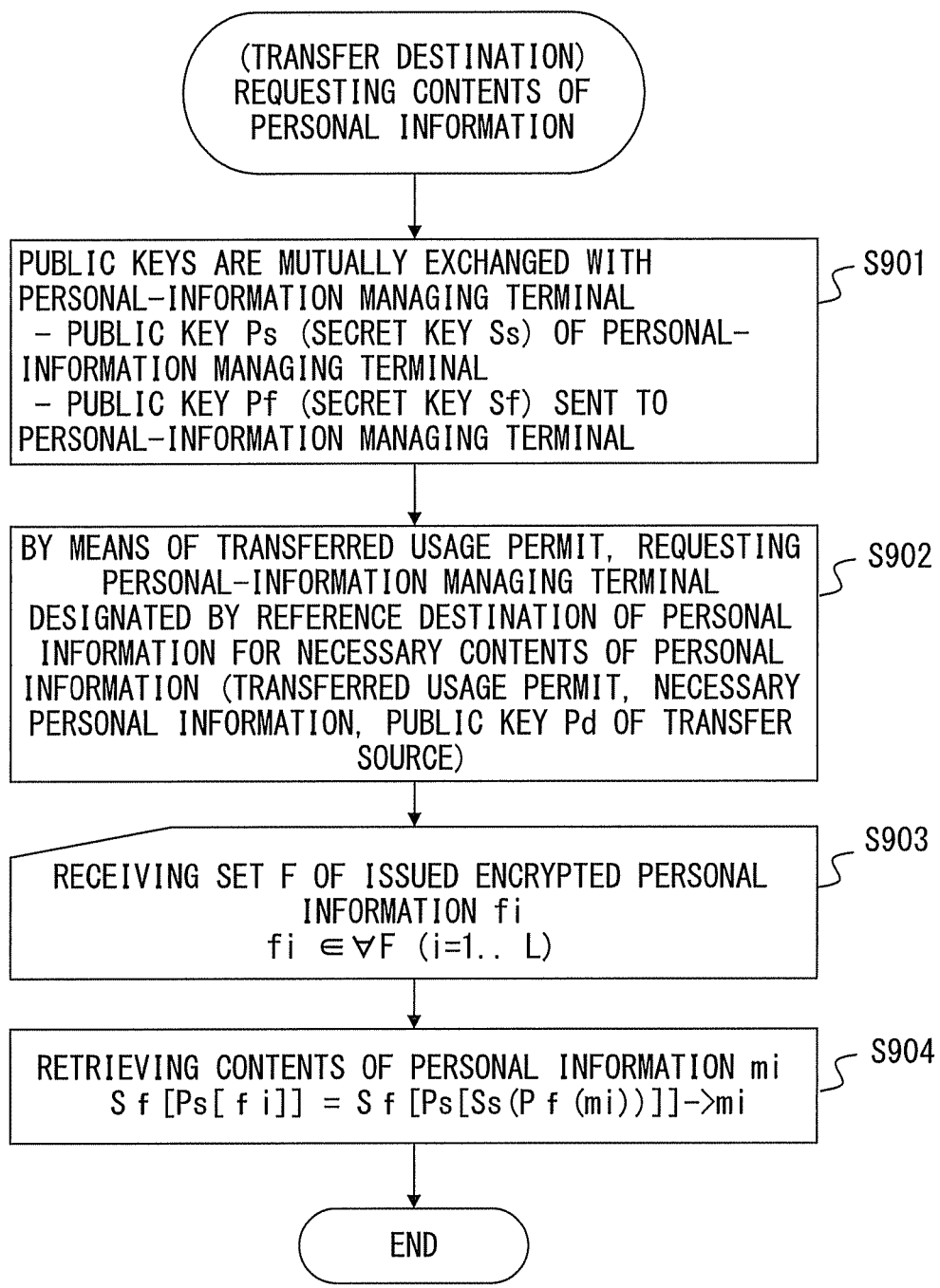
FIG. 9 is a flowchart illustrating a control of the process of requesting the content of personal information, which is executed by a personal-information handling system of a transfer destination.

FIG. 9 is a flowchart illustrating a control of the process of requesting the contents of personal information, executed by the personal-information handling system 103-D of the transfer destination. In the following description, FIG. 9 and FIG. 6 are to be referred to as necessary.

First, before requesting the content of the personal information, the credibility establishing unit 104 in the personal-information handling system 103 of a transfer source exchanges public keys to establish credibility with the credibility establishing unit 108 of the personal-information managing system 102 (S901 in FIG. 9). That is, a public key Pd (corresponding secret key is Sd) is issued from the personal-information handling system 103 to the personal-information managing system 102, and in the other direction, a public key Ps (corresponding secret key is Ss) is issued from the personal-information managing system 102 to the personal-information handling system 103.

Next, the personal-information processing unit 105 in the personal-information handling system 103 requests, by means of the usage permit received from the transfer source, the necessary content of personal information to the personal-information managing terminal 101 specified by the reference destination received from the same transfer source. In addition, the personal-information processing unit 105 sends the public key Pd issued from the personal-information handling system 103 of a transfer source thereto to the personal-information managing terminal 101 (S902 in FIG. 9).

Subsequently, the personal-information processing unit 105 receives a new usage permit issued from the personal-information managing terminal 101 and sets $F=\{fi|1 \le i \le L\}$ having L pieces of encrypted personal information fi (L is natural number equal to or larger than 1) (S903 in FIG. 9).

The personal-information processing unit 105 obtains $Ps(fi)$ ($1 \le i \le L$) by decoding the pieces of encrypted data $fi(1 \le i \le L)$ with the public key Ps sent from the personal-information managing system 102, and obtains $Sf(Ps(fi))$ ($1 \le i \le L$) by decoding the obtained data with the secret key Sf of the personal-information handling system 103. Thus, L pieces of personal information $mi(1 \le i \le L)$ issued from the personal-information managing system 102 are retrieved (S904 in FIG. 9). This is represented by the following equation.

$$Sf(Ps(fi)) = Sf(Ps(Ss(Pf(mi))))$$
$$= Sf(Pf(mi))$$
$$= mi$$

Figure 10:
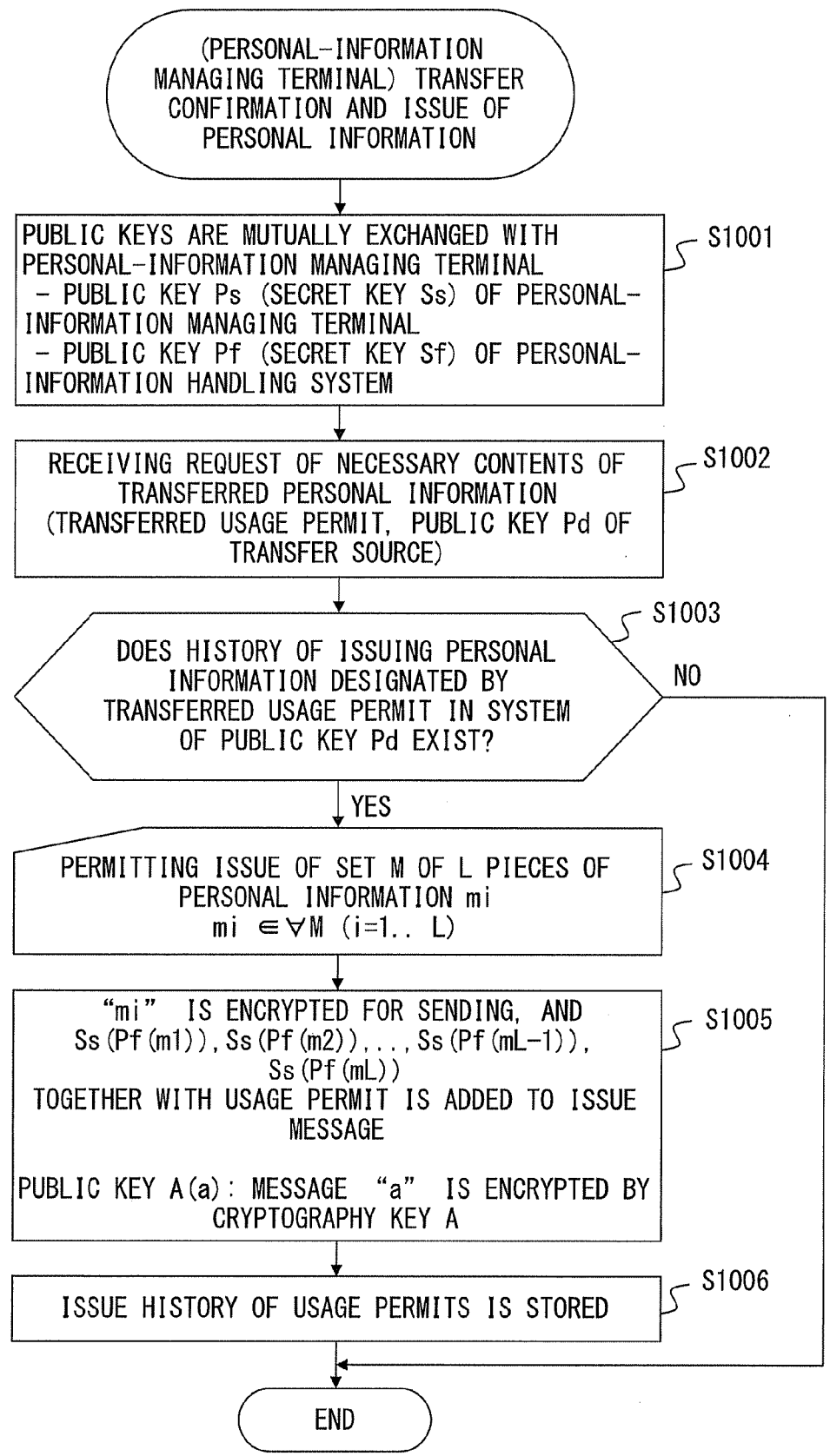
FIG. 10 is a flowchart illustrating a control of transfer confirmation and issuing processes of personal information, which is executed by a personal-information managing system in a personal information managing terminal.

FIG. 10 is a flowchart illustrating a control of transfer confirmation and issuing processes of personal information, performed by the personal-information managing system 102 in the personal information managing terminal 101, in response to the process of requesting the content of the personal information, performed by the personal-information handling system 103-D of the transfer destination. In the following description, FIG. 10 and FIG. 6 are to be referred to as necessary.

First, in a similar manner as the credibility establishing unit 104 in the personal-information handling system 103-S of a transfer source (S901 in FIG. 9), the credibility establishing unit 108 in the personal-information managing system 102 exchanges public keys with the credibility establishing unit 104 in the personal-information handling system 103-S of the transfer source to establish credibility (S1001 in FIG. 10).

Next, the personal-information request receiving unit 107 in the personal-information managing system 102 receives the request for the necessary content of the personal information from the personal-information handling system 103-D of the transfer destination together with both the usage permit transferred from the personal-information handling system 103-S of a transfer source and a public key Pd issued from the personal-information handling system 103-S of a transfer source (S1002 in FIG. 10).

Next, the usage-permission confirming unit 109 in the personal-information managing system 102 searches the usage permission issue history 117 (see FIG. 15) of the policy management unit 111 in order to determine whether the entry corresponding to the history of issuing the personal information that is designated by the above usage permit transferred to the system that is designated by the received public key Pd exists (S1003 in FIG. 10).

If the above entry does not exist, the above request for the personal information is invalid, and thus the process is simply terminated.

If the above entry exists, the usage-permission confirming unit 109 in the personal-information managing system 102 confirms a procedure such as the transfer of the personal information with the user as necessary. Specifically, the following processes are performed in the policy management unit 111.

First, the policy inquiring unit 112 makes an inquiry into the usage permission policy 114 and the usage prohibition policy 115, thereby determining the permission/prohibition of issuing the required personal information to the personal-information handling system 103-D of the transfer destination.

Next, based on a result of inquiry made by the policy inquiring unit 112, the usage-permission issuing unit 116 permits handling of the required personal information by the personal information handling service of the transfer destination, and issues a new usage permit that is to be distributed as the permit (S1004 in FIG. 10). The usage-permission issuing unit 116 may confirm the handling with the user as required, referring to the usage permission policy 114.

The personal-information issuing unit 110 in the personal-information managing system 102 obtains $Pf(mi)$ ($1 \le i \le L$) by encrypting set $M=\{mi|1 \le i \le L\}$ having L pieces of personal information whose issue is permitted by the usage-permission issuing unit 116 with the public key Pf issued from the personal-information handling system 103-D, and obtains $Ss(Pf(mi))$ ($1 \le i \le L$) by encrypting the obtained personal information with the secret key Ss of the personal-information managing system 102. Then the personal-information issuing unit 110 sends the obtained personal information to the personal-information handling system 103-D together with the usage permit of personal information (S1005 in FIG. 10). The usage permit may be encrypted together with the personal information.

When a usage permit is issued, the usage-permission issuing unit 116 records a history of issuing new usage permission to the usage permission issue history 117 (S1006 in FIG. 10).

As described above, in the third embodiment, the personal-information handling system 103 that received the personal information can transfer the all of the received personal information or a part of the personal information to another personal-information handling system 103. In this process, the information exchanged between the personal-information handling systems 103 is not the personal information itself, but is only the transfer information (usage permit and address of personal information) of the personal information. The personal-information handling system 103 that received the transfer of the personal information can request necessary personal information from the personal-information managing terminal 101 by notifying the personal-information managing terminal 101 that the personal-information handling system 103 received the transfer via the usage permit transferred from the transfer source. For this reason, the personal-information managing terminal 101 can prevent the personal information from being transferred arbitrarily from the personal-information handling system 103-S of the transfer source to the personal-information handling system 103-D of the transfer destination. In addition, the personal information related to the transfer can be recorded as usage permission issue history 117. Thus the personal-information managing terminal 101 has the initiative for issuing personal information to the personal-information handling systems 103 of both the transfer source and the transfer destination.

The fourth embodiment is now described. The fourth embodiment is an extension of the third embodiment (FIG. 6-FIG. 10), and further capable of making an inquiry for the personal information required at the personal-information handling system 103-D of the transfer destination directly with the personal-information managing terminal 101.

Figure 11:
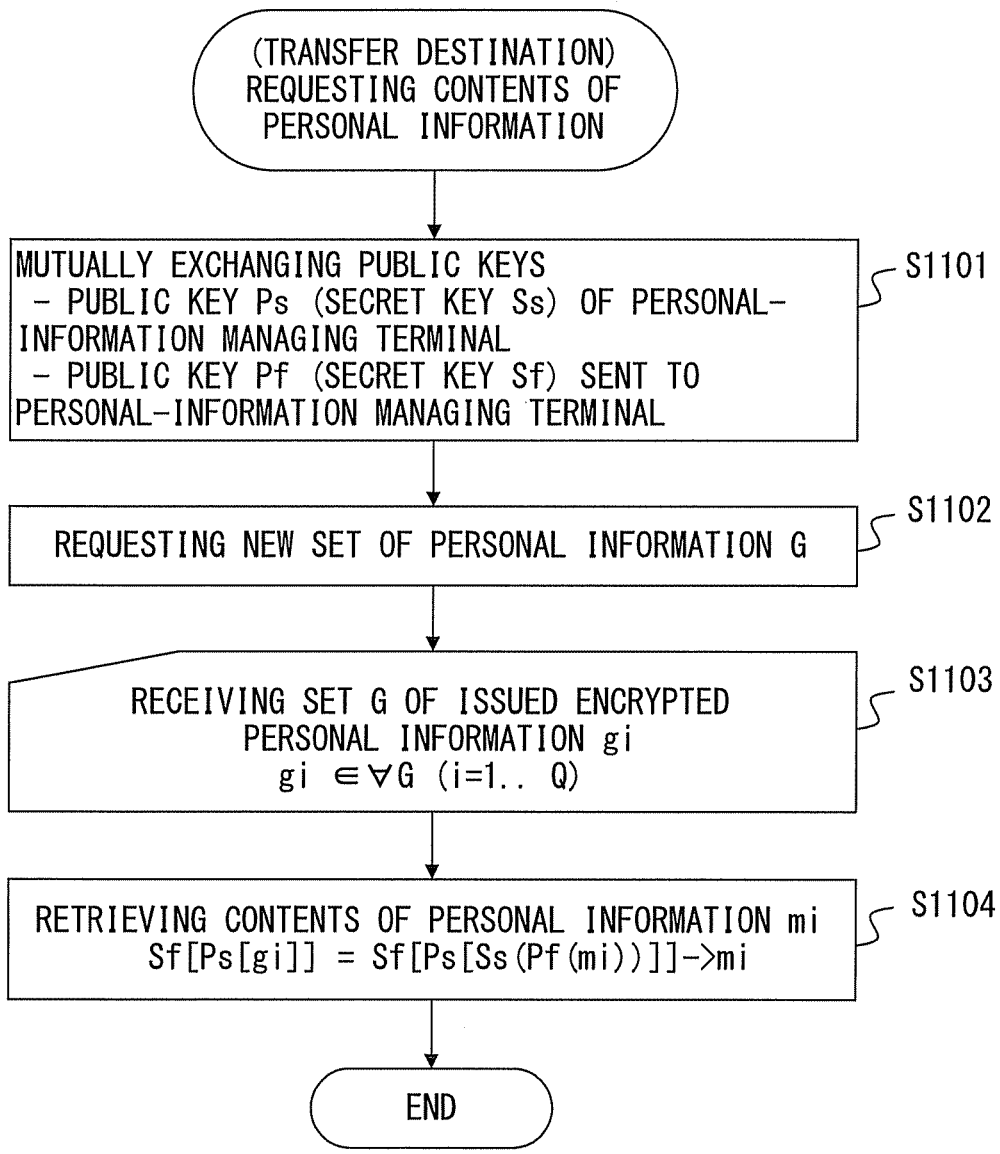
FIG. 11 is a flowchart illustrating a control of the process of making an inquiry for new personal information, which is executed by a personal-information handling system of a transfer destination.

FIG. 11 is a flowchart illustrating a control of making an inquiry for new personal information, performed by the personal-information handling system 103-D of a transfer destination. In the following description, FIG. 11 and FIG. 6 are to be referred to as necessary.

First, in a similar manner as in step 901 of FIG. 9, before requesting the content of the personal information, the credibility establishing unit 104 in the personal-information handling system 103-D exchanges public keys to establish credibility with the credibility establishing unit 108 of the personal-information managing system 102 (S1101 in FIG. 11).

Next, the personal-information processing unit 105 in the personal-information handling system 103 requests new set of personal information G apart from the request for personal information that is based on a transfer (S1102 in FIG. 11).

Subsequently, the personal-information processing unit 105 receives the usage permit issued from the personal-information managing system 102, and sets G={gi|1≤i≤Q} having Q pieces of encrypted personal information gi (Q is natural number equal to or larger than 1) (S1103 in FIG. 11).

Then, the personal-information processing unit 105 obtains Ps(gi) (1≤i≤Q) by decoding the pieces of encrypted data gi(1≤i≤Q) with the public key Ps sent from the personal-information managing system 102, and obtains Sf(Ps (gi)) (1≤i≤Q) by decoding the obtained data with the secret key Sf of the personal-information handling system 103. By so doing, the personal-information processing unit 105 retrieves Q pieces of personal information mi(1≤i≤Q) issued from the personal-information managing system 102 (S1104 in FIG. 11). This is represented by the following equation.

$$Sf(Ps(gi)) = Sf(Ps(Ss(Pf(mi))))$$
$$= Sd(Pf(mi))$$
$$= mi$$

As described above, even if the personal information is transferred and written in the usage permission issue history 117 of the personal-information managing terminal 101, as long as different personal information is required, it is handled as a normal request for personal information.

Lastly, the implementation in which the second through fourth embodiments are implemented as a specific communication system is described with reference to FIGS. 17 through 20.

In configurations such as those in FIG. 5 or FIG. 6, when it is difficult to implement the function of waiting for an information request for the personal information in the personal-information managing terminal 101, as illustrated in FIG. 17, an information request listening unit 1701 that corresponds to the personal-information request receiving unit 107 and the credibility establishing unit 108 in the personal-information managing system 102 of FIGS. 5 and 6 may be arranged on an external server such as a server (e-mail receiving server) 1703. In addition, the personal-information managing terminal 101 may include only an information request processing unit 1702 that corresponds to the usage-permission confirming unit 109, the personal-information issuing unit 110, and the policy management unit 111, of FIGS. 5 and 6.

In this case, the request for the personal information from personal-information handling system 103 is transmitted from a server (e-mail sending server) 1704 to the information request listening unit 1701 of an e-mail receiving server 1703 via an e-mail. Then, the request is further transmitted to the information request processing unit 1702 in the personal-information managing terminal 101 via an e-mail. If the time interval of checking the mail server is shortened, such as when a mobile phone receives an e-mail, sufficient immediacy is realized even with an asynchronous medium such as e-mail.

Alternatively, the communications protocol used for transferring personal information may be a Web protocol such as HTTP (HYPERTEXT TRANSFER PROTOCOL) instead of an e-mail.

Figure 18:
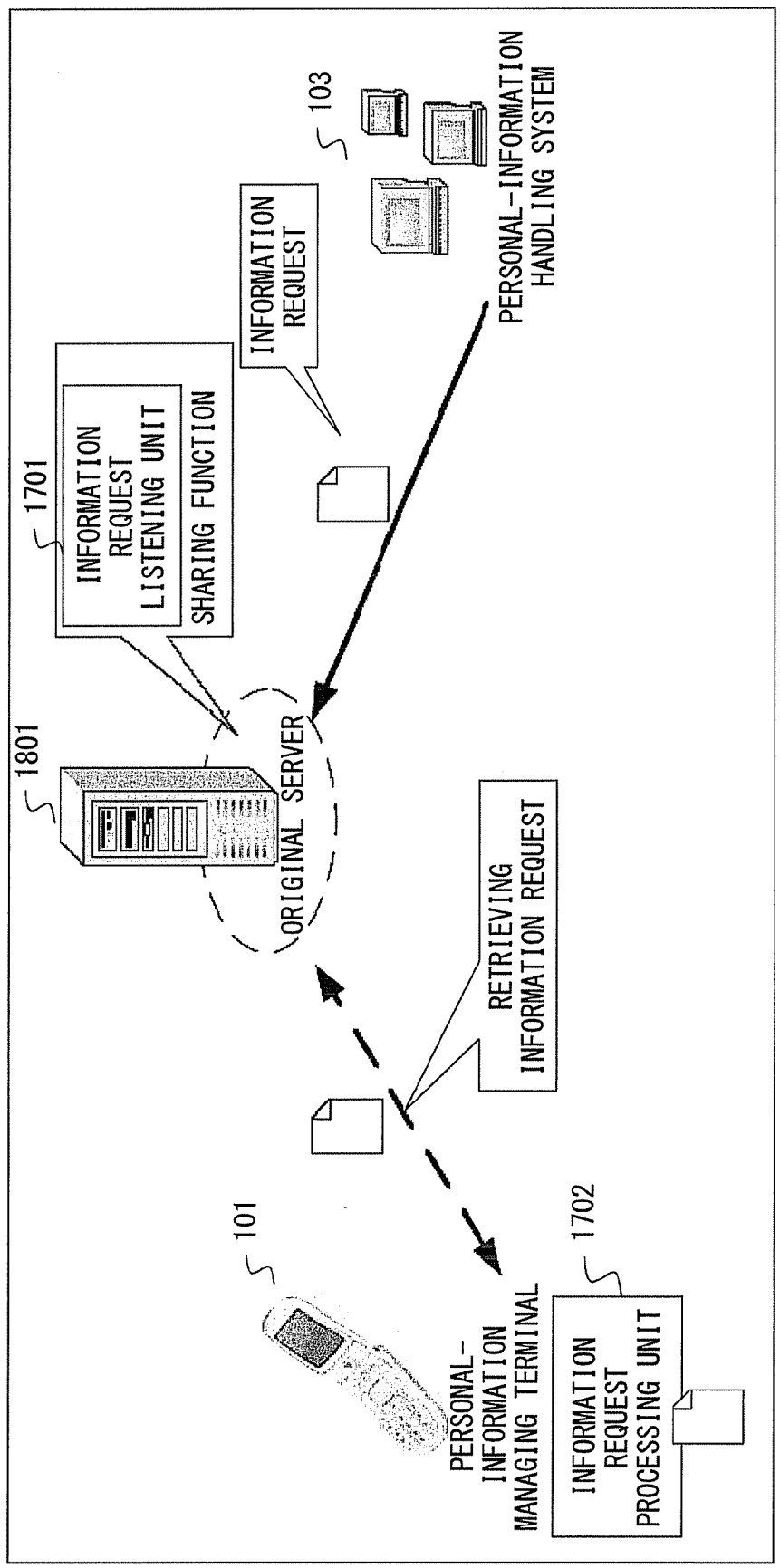
FIG. 18 is a system implementation example in which an information request listening function is implemented on an external original server apart from a personal information managing terminal.

The information request listening unit 1701 may be implemented on a original server 1801 that can directly communicate with both the personal-information managing terminal 101 and the personal-information handling system 103, instead of an already-existing server as in the above, as illustrated in FIG. 18.

Figure 19:
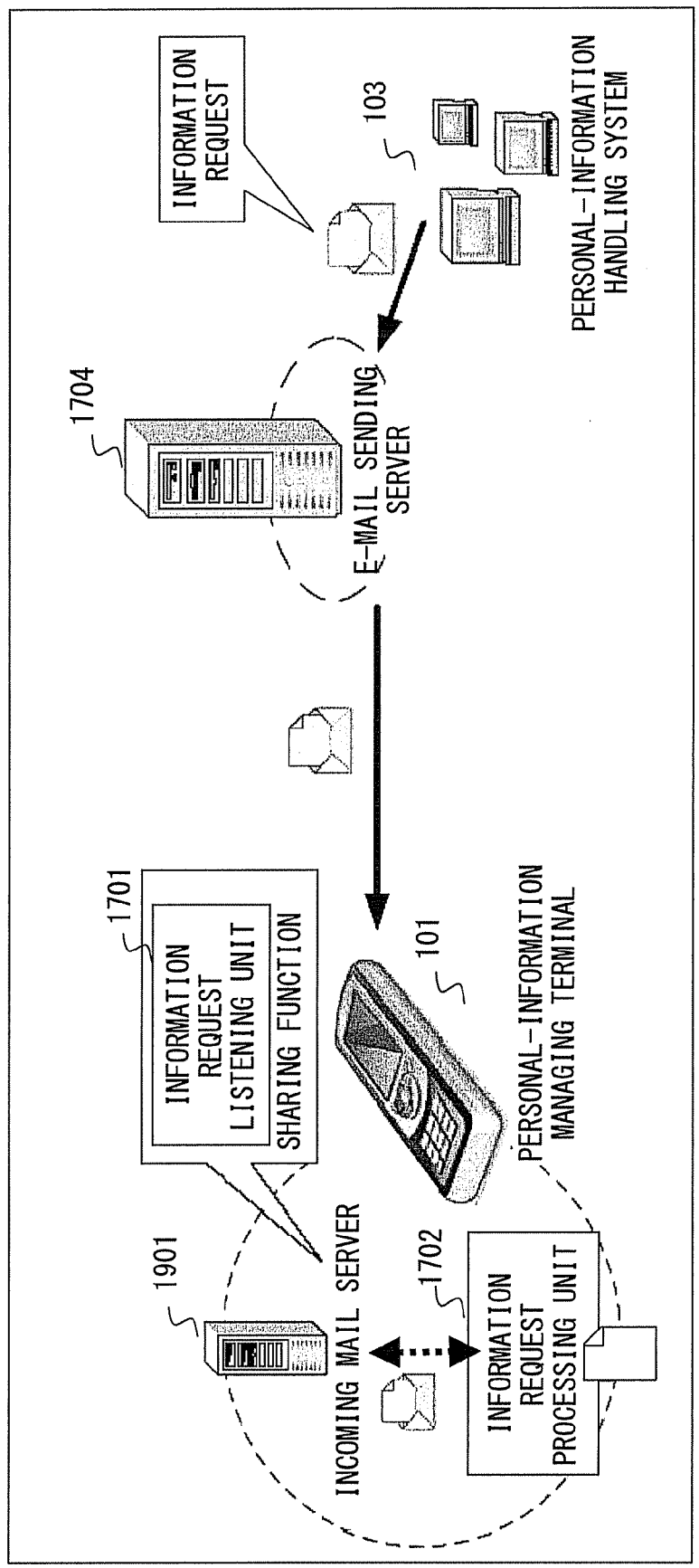
FIG. 19 is a system implementation example in which an information request listening function is implemented on an already-existing server in a personal information managing terminal.
Figure 20:
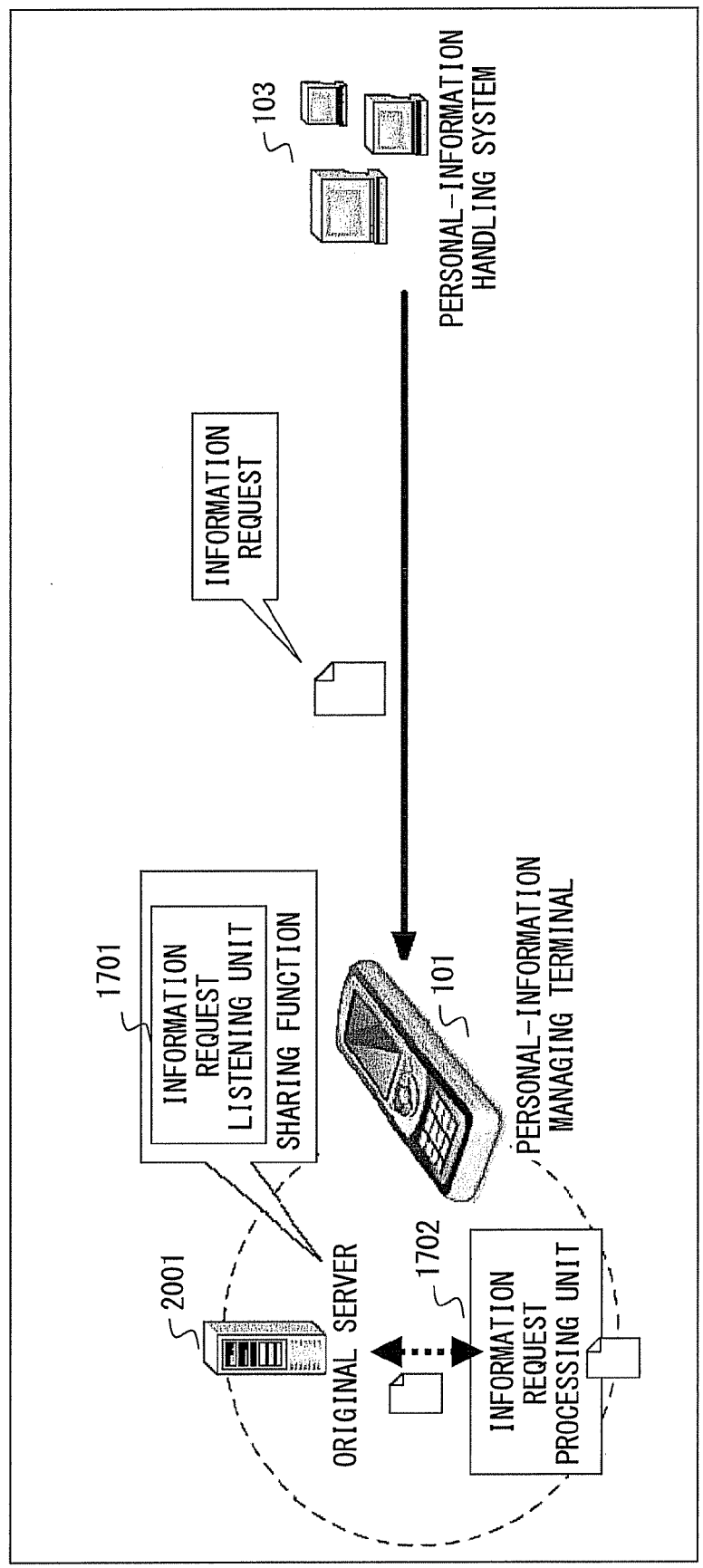
FIG. 20 is a system implementation example in which an information request listening function is implemented on a original server in a personal information managing terminal.

On the other hand, when the personal-information managing terminal 101 implements an operating system equivalent to a personal computer, a function equivalent to the e-mail receiving server 1703 of FIG. 17 or a function equivalent to the original server 1801 of FIG. 18 may be implemented in the personal-information managing terminal 101 as illustrated as 1901 in FIG. 19 or 2001 in FIG. 20.

Also, at the side of personal-information handling system 103, the information request listening function may be implemented in an external server, or may be internally implemented.

As described above, in the terminal to which personal information is frequently input, services such as provision of a prediction at the time of communicating with another system, the transfer of the personal information, or direct inquiry when personal information is lacking are realized by providing the personal information to systems under the control of a user.

According to the embodiments above, a usage permission policy is added when a user provides the personal information (even if the personal information is transferred to a different service), the personal information can be used only after making an inquiry from the transfer destination to a terminal or the like in which the personal-information managing apparatus of the user is implemented, and even if a number of services are associated together, the user can control the personal information (or the user can limit the transfer of the personal information).

According to the embodiments above, the service to which the personal information is transferred can independently request that the user provide the other necessary personal information as the service has the reference destination information of the personal information.

According to the embodiments above, by accumulating the issue history of the usage permission policy of the personal information, semi-automatically, the personal information usage permission policy can be predicted also with respect to the other services.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has(have) been described in detail, it should be understood that the various changes, substitutions, and alterations could be made hereto without departing from the spirit and scope of the invention.

What is claimed is:

1. A personal-information managing apparatus that inputs or stores personal information to issue the input or stored personal information to a personal-information handling apparatus, the personal-information managing apparatus comprising:
    a usage permission policy manager to manage usage permission policy in which a boundary between usage permission and usage prohibition of the personal information is defined;
    a personal information request receiver to receive a request for the personal information from the personal-information handling apparatus;
    a usage-permission issuing unit to obtain the usage permission policy corresponding to the received request via the usage permission policy manager, and to issue a usage permit corresponding to the usage permission policy and the requested personal information to the personal-information handling apparatus;
    a usage permit issue history manager to manage issued history information including the usage permit and usage permission issue history relating to the personal information;
    a credibility establishing unit to establish credibility of information exchange with the personal-information handling apparatus in relation to the issuing of the usage permit and the personal information, and
    a confirming unit to confirm a transfer of the personal information with a user included in transfer information when the transfer information received from a transfer destination of the personal information is detected in the issued history information.

2. The personal-information managing apparatus according to claim 1, wherein
    the usage permission policy manager predicts the usage permission policy at least using the usage permission issue history, and manages the predicted usage permission policy as a part of the usage permission policy.

3. A personal-information handling apparatus that requests and obtains personal information from a personal-information managing apparatus to use the obtained personal information, the personal-information handling apparatus comprising:
    a personal information requester to request necessary personal information from the personal-information managing apparatus including a confirming unit to confirm a transfer of the personal information with a user included in transfer information when the transfer information received from a transfer destination of the personal information is detected in the issued history information including a usage permit and usage permission issue history relating to the personal information;
    a personal information obtaining unit to receive a usage permit designating a usage permission policy in which a boundary of usage permission or usage prohibition of the personal information is defined, and to receive the requested personal information;
    a credibility establishing unit to establish credibility of information exchange with the personal-information managing apparatus in relation to the requesting or receiving of the personal information and the usage permit, the personal-information managing apparatus manages issued history information including the usage permit and usage permission issue history relating to the personal information; and
    a personal information processor to interpret the usage permission policy designated by the received usage permit, and to use the personal information using the interpreted result.

4. The personal-information handling apparatus according to claim 3, further comprising
    a personal information transfer issuing unit to transfer the usage permit received from the personal-information managing apparatus as well as information related to a reference destination of the personal information designated by the usage permit to another personal-information handling apparatus.

5. The personal-information handling apparatus according to claim 3, further comprising
    a personal information transfer receiver to receive a transfer of the usage permit and information related to a reference destination of the personal information designated by the usage permit from another personal-information handling apparatus, wherein
    the personal information requester requests necessary personal information from the personal-information managing apparatus specified by the information related to the reference destination of the personal information using the transferred usage permit, and
    the personal information obtaining unit receives a new usage permit and personal information corresponding to the request, from the personal-information managing apparatus.

6. The personal-information managing apparatus according to claim 1, wherein
    the personal information request receiver receives a request for personal information from a first personal-information handling apparatus using the usage permit transferred from a second personal-information handling apparatus, and
    the usage-permission issuing unit searches for whether the usage permission issue history corresponding to the received usage permit exists in the usage permit issue history manager, obtains the usage permission policy corresponding to the request for personal information from the usage permission policy manager when the corresponding history exists, and issues a new usage permit corresponding to the usage permission policy and the requested personal information to the first personal-information handling apparatus.

7. The personal-information managing apparatus according to claim 1, wherein
    when a request for a personal information received by the personal information request receiver is similar to a request for which the usage-permission issuing unit has issued a usage permit, included in the issued history information, with some kind of rules, the usage-permission issuing unit issues a usage permit corresponding to a usage permission policy used when the usage-permission issuing unit has issued the usage permit with some kind of rules.

8. The personal-information handling apparatus according to claim 3, wherein when the personal-information managing apparatus receives a request, similar to a request for which the personal-information managing apparatus has issued a usage permit with some kind of rules, for a personal information, the personal-information managing apparatus issues a usage permit corresponding to a usage permission policy used when the personal-information managing apparatus has issued the usage permit with some kind of rules.

* * * * *